United States Patent
Baily et al.

(10) Patent No.: US 6,331,006 B1
(45) Date of Patent: Dec. 18, 2001

(54) BRUSH SEAL MOUNTING IN SUPPORTING GROOVE USING FLAT SPRING WITH BIFURCATED END

(75) Inventors: Frederick G. Baily, Ballston Spa; Lawrence E. Rentz, Clifton Park; Klaus M. Retzlaff, Schenectady; Norman A. Turnquist, Carlisle, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/491,598

(22) Filed: Jan. 25, 2000

(51) Int. Cl.[7] ............................. F16J 15/447; F16J 15/54
(52) U.S. Cl. ................................................. 277/355
(58) Field of Search .............................. 277/355

(56) References Cited

U.S. PATENT DOCUMENTS

| | | |
|---|---|---|
| 768,593 | 8/1904 | Emmet et al. . |
| 779,785 | 1/1905 | Junggren . |
| 910,472 | 1/1909 | Junggren . |
| 957,887 | 5/1910 | Junggren . |
| 980,282 | 1/1911 | Junggren . |
| 1,352,277 | 9/1920 | Junggren . |
| 1,352,278 | 9/1920 | Junggren . |
| 1,505,647 | 8/1924 | Junggren . |
| 1,505,924 | 8/1924 | Warren . |
| 1,536,014 | 4/1925 | Junggren . |
| 1,594,838 | 8/1926 | Kigresse . |
| 1,651,855 | 12/1927 | Warren . |
| 1,670,071 | 5/1928 | Junggren . |
| 1,895,930 | 1/1933 | Junggren . |
| 2,336,323 | 12/1943 | Warren . |
| 2,600,991 | 6/1952 | Hargrove . |
| 2,709,338 | 5/1955 | Morley et al. . |
| 3,186,168 | 6/1965 | Ormerod et al. . |

(List continued on next page.)

FOREIGN PATENT DOCUMENTS

| | | |
|---|---|---|
| 2938-484 | 3/1981 | (DE) . |
| 0453315 A1 | 10/1991 | (EP) . |
| 2 191 825 A | 12/1987 | (GB) . |
| 2 301 635 | 12/1996 | (GB) . |
| 421302 | 5/1947 | (IT) . |
| 3-209068 | 9/1991 | (JP) . |
| WO92/05378 | 4/1992 | (WO) . |

OTHER PUBLICATIONS

Positive Pressure Variable Clearance Packing, Morrison et al.,; GE Turbine Reference Library, 5/90.

Primary Examiner—Anthony Knight
Assistant Examiner—John L. Beres
(74) Attorney, Agent, or Firm—Nixon & Vanderhye

(57) ABSTRACT

A plurality of brush seal segments are disposed in a groove of a component fixed against rotation and project into sealing relation with a rotating component. The brush seal segments are each comprised of a pair of plates having a plurality of brush bristles therebetween, the plates and bristles being secured along the outer arcuate face of the segments by a weld bead. The opposite ends of the bristles form the seal with the rotary component. Each brush seal segments is disposed in a groove with generous clearance between a hook on the segment and a flange on the fixed component. A spring between the fixed component and arcuate outer face of the brush seal segment biases the segment in a radial direction. The end of the spring has a pair of tabs spaced axially from one another for reception in a pair of axially spaced recesses to retain the spring against circumferential movement while simultaneously maintaining the integrity of the weld joint without loss of securement of the bristles.

11 Claims, 2 Drawing Sheets

U.S. PATENT DOCUMENTS

| | | |
|---|---|---|
| 3,463,498 | 8/1969 | Bill . |
| 3,759,038 | 9/1973 | Scalzo et al. . |
| 4,195,476 | 4/1980 | Wood . |
| 4,202,554 | 5/1980 | Snell . |
| 4,358,120 | 11/1982 | Moore . |
| 4,415,309 | 11/1983 | Atterbury . |
| 4,422,288 | 12/1983 | Steber . |
| 4,541,741 | 9/1985 | Woodbridge . |
| 4,567,730 | 2/1986 | Scott . |
| 4,580,346 | 4/1986 | Reichl . |
| 4,730,876 | 3/1988 | Werner et al. . |
| 4,756,536 | 7/1988 | Belcher . |
| 4,781,388 | 11/1988 | Worhl . |
| 4,785,623 | 11/1988 | Reynolds . |
| 4,809,990 | 3/1989 | Merz . |
| 4,901,522 | 2/1990 | Commaret et al. . |
| 4,971,336 | 11/1990 | Ferguson . |
| 4,989,886 | 2/1991 | Rulis . |
| 5,002,288 | 3/1991 | Morrison et al. . |
| 5,026,252 | 6/1991 | Hoffelner . |
| 5,029,875 | 7/1991 | Spain et al. . |
| 5,029,876 | 7/1991 | Orlando et al. . |
| 5,066,025 | 11/1991 | Hanrahan . |
| 5,074,748 | 12/1991 | Hagle . |
| 5,076,590 | 12/1991 | Steinetz et al. . |
| 5,090,710 | 2/1992 | Flower . |
| 5,106,104 | 4/1992 | Atkinson et al. . |
| 5,110,033 | 5/1992 | Noone et al. . |
| 5,114,159 | 5/1992 | Baird et al. . |
| 5,135,237 | 8/1992 | Flower . |
| 5,174,582 | 12/1992 | Ferguson . |
| 5,176,389 | 1/1993 | Noone et al. . |
| 5,181,728 | 1/1993 | Stec . |
| 5,181,827 | 1/1993 | Pellow et al. . |
| 5,192,084 | 3/1993 | Norbury . |
| 5,201,530 | 4/1993 | Kelch et al. . |
| 5,316,318 | 5/1994 | Veau . |
| 5,318,309 | 6/1994 | Tseng et al. . |
| 5,335,920 | 8/1994 | Tseng et al. . |
| 5,351,971 | 10/1994 | Short . |
| 5,374,068 | 12/1994 | Jewett et al. . |
| 5,400,586 | 3/1995 | Bagepalli et al. . |
| 5,401,036 | 3/1995 | Basu . |
| 5,474,305 | 12/1995 | Flower . |
| 5,474,306 | 12/1995 | Bagepalli et al. . |
| 5,480,165 | 1/1996 | Flower . |
| 5,503,405 | 4/1996 | Jewett et al. . |
| 5,509,780 | 4/1996 | Synfelt . |
| 5,524,340 | 6/1996 | Galbraith et al. . |
| 5,597,167 | 1/1997 | Snyder . |
| 5,599,026 | 2/1997 | Sanders et al. . |
| 5,630,590 | 5/1997 | Bouchard et al. . |
| 5,749,584 | 5/1998 | Skinner et al. . |
| 6,045,134 * | 4/2000 | Turnquist et al. .................... 277/355 |

* cited by examiner

BRUSH SEAL MOUNTING IN SUPPORTING GROOVE USING FLAT SPRING WITH BIFURCATED END

BACKGROUND OF THE INVENTION

The present invention relates generally to brush seals and more particularly to a resilient mounting for brush seals between a rotating component and a component fixed against rotation which facilitates installation of the seal.

Brush seals are commonly used to minimize leakage through a gap between a rotating component and a component fixed against rotation. For example, brush seals are commonly used in rotating machinery such as steam turbines and gas turbines used for power generation. Typically, in a steam turbine, the brush seals minimize leakage of steam and in a gas turbine, minimize leakage of compressed air or combustion gases.

Brush seals are normally formed in arcuate segments, generally conforming to the circumference of the components to be sealed. Each segment typically includes a pair of plates with a plurality of brush bristles disposed between the plates. The plates and ends of the brush bristles between the plates are typically welded to one another, forming a completed brush seal segment. Opposite ends of the bristles project from between the plates and form a seal with the other component, typically the rotating component. One of the plates may be formed with an axially extending hook or flange for mating in a corresponding groove typically on the component fixed against rotation. The brush seals are radially positioned by the close fit between the projecting hook on the brush seal segment and the mating groove of the fixed component, close radial positioning being required for satisfactory functioning of the seal. That close radial positioning, however, requires tight tolerances between the brush seal hook and the groove of the fixed component, resulting in costly parts and potential for installation difficulty. Consequently, there has developed a need for a brush seal installation which can minimize or eliminate the heretofore need for tight tolerances between the brush seal's projecting hook and the corresponding groove whereby the potential for installation problems can be minimized or eliminated.

BRIEF SUMMARY OF THE INVENTION

In accordance with a preferred embodiment of the present invention, there is provided a brush seal segment having projecting bristles for forming a seal between a rotary component and a component fixed against rotation. The latter component typically carries the brush seal segment. For example, the brush seal segment in accordance with a preferred form of the present invention may be mounted in a spill strip ring having labyrinth teeth spaced axially from the brush seal segment for forming a combined labyrinth/brush seal with covers of the rotating buckets. To facilitate the installation of the brush seal segment in the spill strip ring or other components fixed against rotation, generous clearances may be provided between the radial height of the brush seal hook and the groove receiving the flange. Particularly, the brush seal segment may be formed of a pair of plates, i.e., a front plate and a back plate, with brush bristles disposed between the plates, the plates and ends of the bristles being welded along an arcuate face of the brush seal segment. The brush seal bristles, of course, extend from the opposite arcuate edge of the brush seal segment for sealing engagement with the other component.

A spring is disposed between the arcuate face of the brush seal segment and the base of the groove in which the segment resides. Preferably, the spring is a flat leaf spring. In order to preclude circumferential movement of the spring relative to the brush seal segment, the spring is fixed against circumferential movement to the segment. To accomplish this, and in accordance with a preferred form of the present invention, the spring has at least one and preferably a pair of tabs projecting toward the arcuate face of the brush seal segment. The segment has at least one and preferably a pair of radial recesses for receiving the tabs. In this manner, with the tab or tabs received in the recess or recesses, movement of the spring in a circumferential direction is precluded. It will be appreciated that if a single tab is employed to couple the spring and brush seal segment to one another, the tab and recessed arrangement must be spaced from the weld between the plates and the bristles. Otherwise, a break in the weld to accommodate a tab on the spring would locally remove the bristles secured to the segment by the weld. Consequently, in accordance with a preferred form of the present invention, the tab and recess combination lies on one side of the weld or if a pair of tabs and recesses are employed, the tabs and recesses straddle the weld whereby the bristles in the brush seal segment remain intact and secured to the segment. While arcuate sealing segments backed by springs and typically mounting labyrinth seal teeth have been previously employed, backing a brush seal with a spring to bias the seal toward the opposite component has not heretofore to our knowledge been accomplished.

In a preferred embodiment according to the present invention, there is provided a brush seal and spring combination for disposition between a first rotatable component and a second component fixed against rotation, comprising an arcuate brush seal segment for disposition between the first component and the second component and including a pair of arcuate plates, a plurality of brush bristles projecting therefrom having free ends for sealing with the first rotatable component and a weld along the outer face of the plates securing the plates and bristles to one another, and an elongated leaf spring for disposition between the brush seal segment and the second component for biasing the brush seal segment toward the rotating component.

In a further preferred embodiment according to the present invention, there is provided a brush seal and spring combination for disposition between a first rotatable component and a second component fixed against rotation, comprising an arcuate brush seal segment for disposition between the first component and the second component and including a pair of arcuate plates, a plurality of brush bristles projecting therefrom having free ends for sealing with the first rotatable component and a weld along the outer face of the plates securing the plates and bristles to one another, one of the plates having a recess along a radially outer face thereof, and an elongated leaf spring for disposition between the brush seal segment and the second component and having a radially inwardly directed tab for engaging in the recess, the recess and tab being spaced from the weld.

In a still further preferred embodiment according to the present invention, there is provided a brush seal assembly comprising a first rotatable component having an axis of rotation, a second component fixed against rotation about the axis and radially outwardly of the radial component, the fixed component having an axially opening groove, an arcuate brush seal between the rotatable component and the fixed component and including an axial projecting hook for reception in the groove, the brush seal having a support mounting a plurality of bristles projecting therefrom and having free ends in sealing relation with the rotary component, the support having an arcuate radial outer face, a spring between the fixed component and the outer face for biasing the brush seal for movement in a generally radially inward direction, the outer face having at least one recess and the spring having a projecting tab received in the recess.

DETAILED DESCRIPTION OF THE INVENTION

Figure 1:
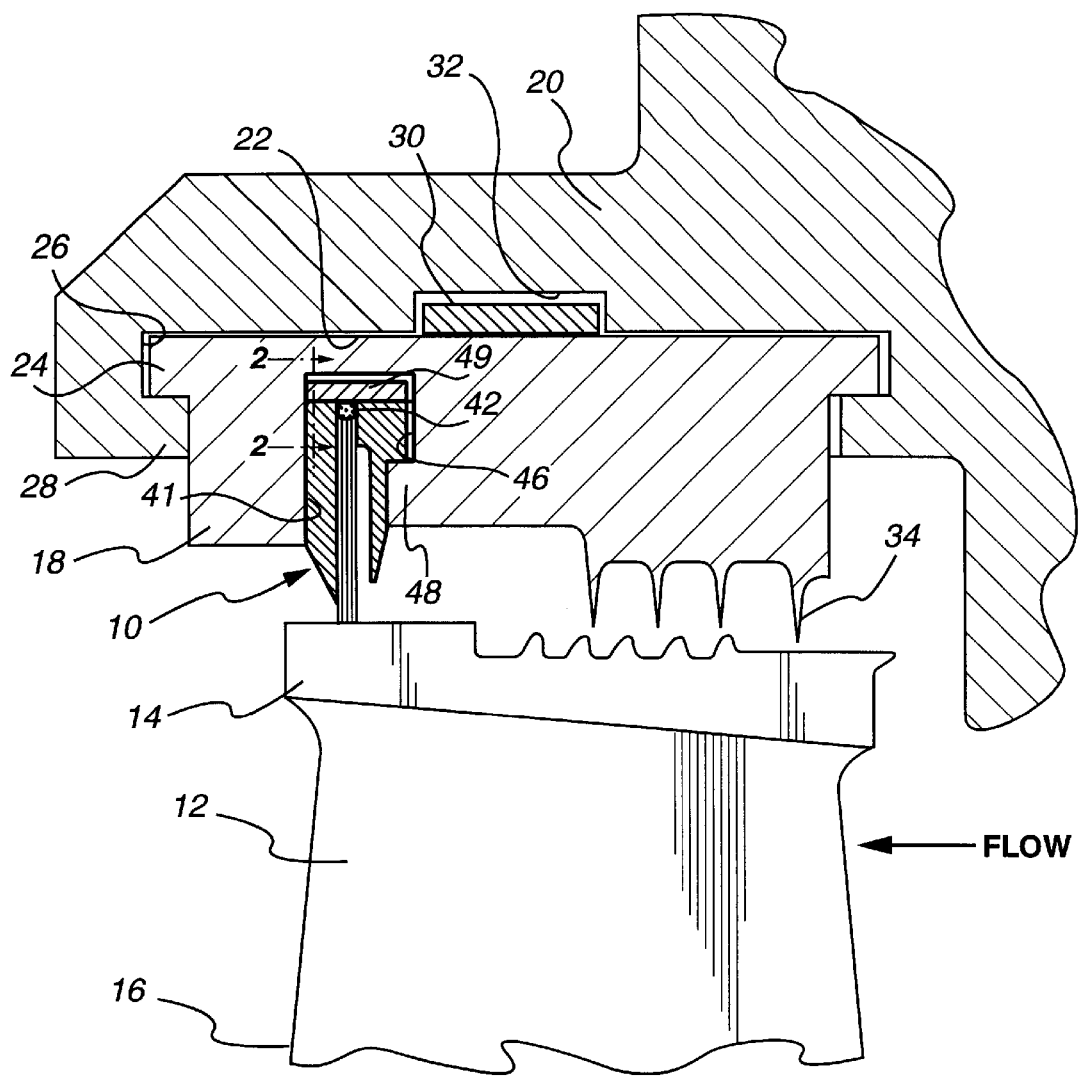
FIG. 1 is a fragmentary cross-sectional view illustrating a spring-backed spill strip ring carried by a component fixed against rotation and a brush seal carried by the ring for sealing engagement with a rotary component in accordance with the present invention.
Figure 2:
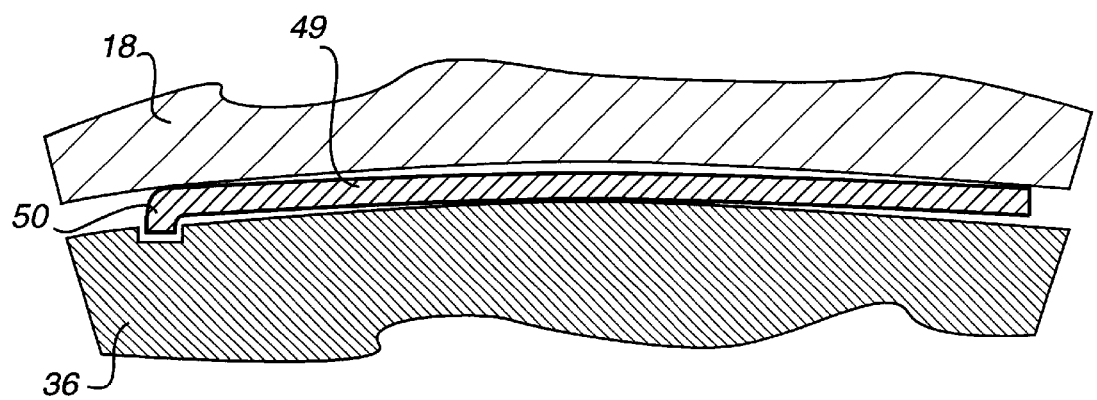
FIG. 2 is a cross-sectional view thereof taken generally about on line 2—2 in FIG. 1.

Referring now to the drawings, particularly to FIG. 1, there is illustrated a brush seal, generally designated 10, for sealing between a first rotatable component 12, in this example, the covers 14 for a plurality of buckets 16 of turbomachinery rotatable about an axis, and a second component 18 fixed against rotation. The second component 18 in this illustrative form is a spill strip ring mounted to a third component 20, similarly fixed against rotation. Spill strip rings 18 comprise arcuate segments disposed end-to-end in a groove 22 formed in the second component 20. Particularly, the ring 18 includes a pair of axially extending flanges 24 for mating with corresponding axial grooves 26 formed by flanges 28 extending axially toward one another. Radial clearance is provided between the flanges 24 and 28 and a spring 30 is mounted in a groove 32 between the two components fixed against rotation. The spring 30 biases the ring 18 in a radial inward direction. As illustrated, the ring 18 mounts a plurality of labyrinth seal teeth 34 axially spaced one from the other.

Brush seal segments 10 are mounted in the spill strip rings 18. Each brush seal segment 10 includes a support, preferably a front plate 38 and plate 36 having a plurality of bristles extending between the plates. The plates 36 and 38 and one end of the plurality of bristles 40 are secured one to the other by welding along an arcuate outer face 43 of the brush seal 10, a weld bead 42 being shown in this illustrative example. The opposite ends of the bristles 40 lie in sealing relationship with the rotating component, in this instance, the bucket cover 14. The bristles are preferably formed of metal but may be formed of other materials such as a ceramic.

The brush seal 10 is mounted in a generally complementary-shaped groove 41 formed in the ring 18. One of the plates, namely plate 38, includes an axially directed hook or flange 44 for reception in a groove 46 defined by a flange 48 formed in the spill strip ring 18. Generous radial clearances are provided between the hook 44 and the groove 46, i.e., the radial height of the groove 46 can exceed by a substantial margin the radial height of the hook 44. To provide the necessary close radial positioning between the strip 18 and the brush seal 10, a spring, preferably a leaf spring 49, is disposed in the groove between the outer surface of the brush seal and the base of the groove in the ring 18. The leaf spring 49 biases the brush seal segment in a radial direction, in this instance, radially inwardly, such that the hook 44 engages against the retaining flange 48 of the ring, maintaining the required positioning of the brush seal relative to the ring and the opposite component. As indicated above, the generous tolerances between the brush seal segments and the mating groove permit easy installation of the brush seal segments within the groove of the rings 18.

Figure 3:
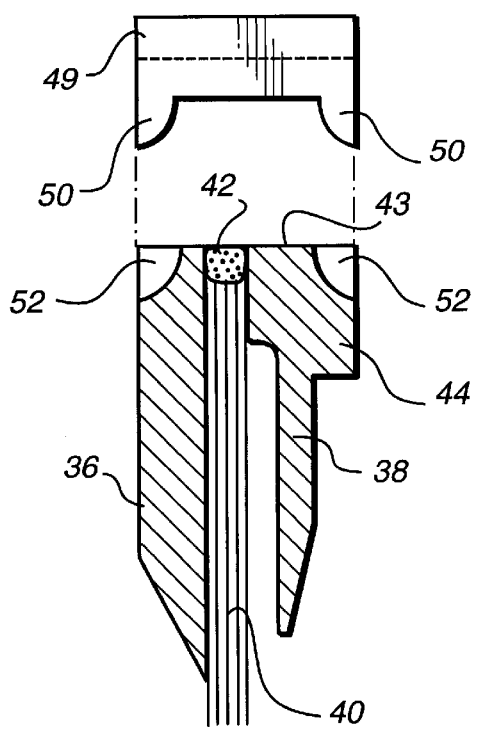
FIG. 3 is a cross-sectional view of the brush seal with the spring in juxtaposition illustrating the tabs and recesses.
Figure 4:
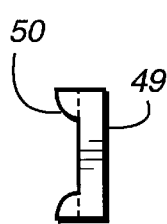
FIG. 4 is an end elevational view of the spring.
Figure 5:
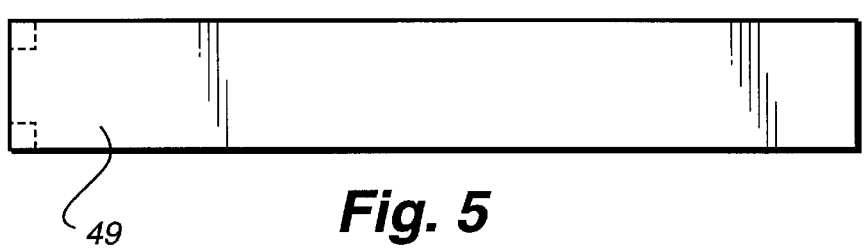
FIG. 5 is a plan view of the spring.
Figure 6:
FIG. 6 is a side elevational view of the spring.

However, in order to preclude circumferential movement of the springs 49 and simultaneously maintain the bristles intact as part of the brush seal, each spring 49 and brush seal segment 10 have complementary tabs and recesses offset from the weld bead 42. For example, as illustrated in FIG. 3, the spring 49 includes at least one tab 50 and preferably a pair of tabs 50. The segments 10 include at least one recess 52 and preferably two recesses 52. A recess 52 is preferably provided in the arcuate face of each plate 36 and 38. The tabs and recesses thus lie on opposite sides, i.e., straddle the weld bead 42 when the tabs 50 are engaged in the recesses 52. Accordingly, the weld bead 42 remains intact at the location of the tabs 50 securing the springs 49 to the brush seal segments 10. Consequently, the integrity of the weld is maintained and the bristles in the vicinity of the tabs 50 remain secured to the plates to form part of the brush seal segment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A brush seal and spring combination for disposition between a first rotatable component and a second component fixed against rotation, comprising:

an arcuate brush seal segment for disposition between the first component and the second component and including a pair of arcuate plates, a plurality of brush bristles projecting therefrom having free ends for sealing with the first rotatable component and a weld along the outer face of said plates securing the plates and bristles to one another, one of said plates having a recess along a radially outer face thereof, and an elongated leaf spring for disposition between the brush seal segment and the second component and having a radially inwardly directed tab for engaging in said recess, said recess and tab being spaced from said weld.

2. A combination according to claim 1 wherein said spring includes a second tab spaced from said first tab and another of said plates having a second recess whereby the spring tabs are adapted for engagement in the recesses and straddle the weld.

3. A combination according to claim 2 wherein said tabs are disposed at one end of said spring.

4. A brush seal assembly comprising:

a first rotatable component having an axis of rotation;

a second component fixed against rotation about said axis and radially outwardly of said rotatable component, said fixed component having an axially opening groove;

an arcuate brush seal between said rotatable component and said fixed component and including an axial projecting hook for reception in said groove, said brush seal having a support mounting a plurality of bristles projecting therefrom and having free ends in sealing relation with said rotary component;

said support having an arcuate radial outer face;

a spring between said fixed component and said outer face for biasing said brush seal for movement in a generally radially inward direction, said outer face having at least one recess and said spring having a projecting tab received in said recess.

5. An assembly according to claim 4 wherein said support includes a pair of plates, said bristles being secured to and between said plates by a circumferentially extending weld along said outer face, said recess being located externally to one side of said bristles and in one of said plates.

6. An assembly according to claim 5 including a second projecting tab on said spring spaced from the first mentioned tab, a second recess in said support in another of said plates, said tabs being receivable in said recesses, respectively, whereby said tabs straddle said weld.

7. An assembly according to claim 6 wherein said spring comprises a leaf spring and said tabs project radially inwardly of said leaf spring.

8. An assembly according to claim 4 including a third component fixed against radial and rotational movement, said second component being movable in radial inward and outward directions, a second spring between said second and third components for biasing said second component and said brush seal carried by said second component for movement in a radial inward direction.

9. An assembly according to claim 5 wherein said second component includes at least one labyrinth tooth spaced axially from said brush seal for providing a seal between said first and second components.

10. An assembly according to claim 4 wherein said support includes a pair of plates, said bristles being secured to and between said plates by a circumferentially extending weld along said outer face, said recess being located externally to one side of said bristles and in one of said plates, including a second projecting tab on said spring spaced from the first mentioned tab, a second recess in said support in another of said plates, said tabs being receivable in said recesses, respectively, whereby said tabs straddle said weld, said second component including at least one labyrinth tooth spaced axially from said brush seal for providing a seal between said first and second components.

11. Sealing apparatus comprising:

a first rotatable component;

a second component fixed against rotation;

an arcuate brush seal segment carried by said second component and disposed between said first component and said second component;

said arcuate brush seal segment including a pair of arcuate plates, a plurality of brush bristles projecting therefrom having free ends for sealing with said first rotatable component and a weld along the outer face of said plates securing the plates and bristles to one another; and an elongated leaf spring carried by said second component and disposed between said brush seal segment and said second component for biasing said brush seal segment toward said rotating component, said second component carrying said brush seal segment and said spring and being movable in a radial direction relative to said rotating component.

* * * * *